B. PIPE.
SAFETY ATTACHMENT FOR FAUCETS.
APPLICATION FILED DEC. 11, 1915.
1,212,102.                                   Patented Jan. 9, 1917.
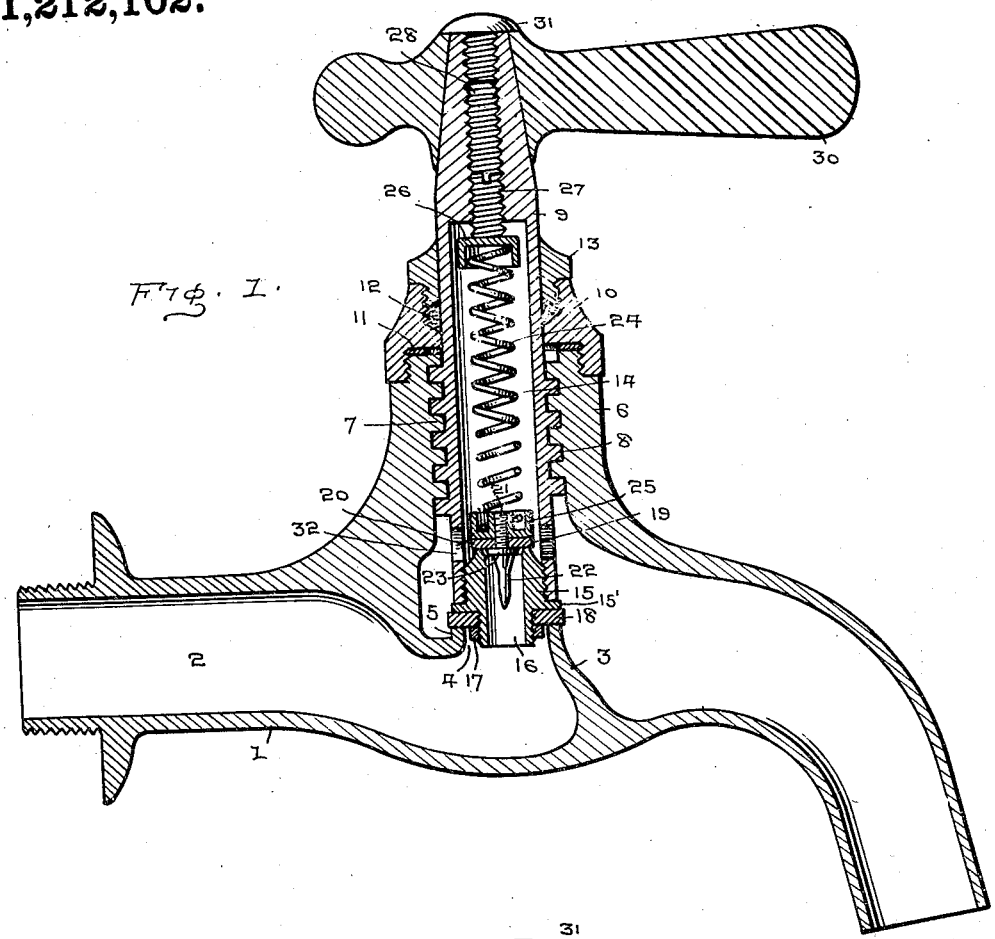
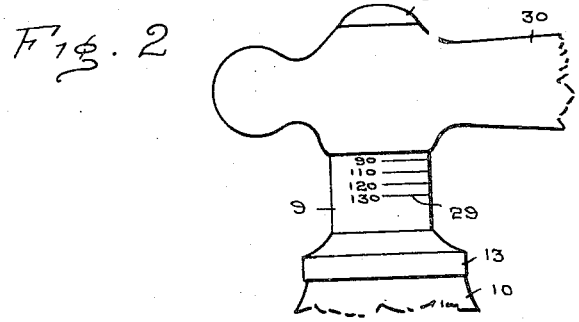

UNITED STATES PATENT OFFICE.

BARNEY PIPE, OF SAN DIEGO, CALIFORNIA.

SAFETY ATTACHMENT FOR FAUCETS.

1,212,102.  Specification of Letters Patent.  Patented Jan. 9, 1917.

Application filed December 11, 1915.  Serial No. 66,302.

*To all whom it may concern:*

Be it known that I, BARNEY PIPE, a citizen of the United States, residing at San Diego, in the county of San Diego and State of California, have invented certain new and useful Improvements in Safety Attachments for Faucets; and I do hereby declare the following to be a full, clear, and exact description of the invention, such as will enable others skilled in the art to which it appertains to make and use the same.

My invention relates to new and useful improvements in safety attachments for faucets, and my object is to provide in connection with the stem of the faucet a valve adapted to be operated by pressure within the pipes to which the faucet is attached.

A further object is to provide means for directing downward pressure on said valve.

A further object is to provide means for regulating the pressure upon the valve.

A further object is to provide means for guiding the valve onto its seat. And a further object is to provide a bypass through the end of the faucet stem.

Other objects and advantages will be hereinafter set forth and more particularly pointed out in the accompanying specification.

In the accompanying drawings which are made a part of this application, Figure 1 is a vertical central sectional view through the faucet, showing my improved device attached thereto, and Fig. 2 is a detail elevation of the upper portion of the faucet.

Referring to the drawings in which similar reference numerals designate corresponding parts throughout the several views, 1 indicates the faucet which may be constructed in the usual or any preferred manner and having a passage 2 extending longitudinally therethrough, said passage being interrupted by a partition 3 through which is formed an opening 4 surrounding the upper edge of which is a flange 5, the upper face of which forms a valve seat.

Extending upwardly from the body of the faucet 1 is a tubular extension 6, the interior of which is provided with threads 7 adapted to engage the threads 8 of a valve stem 9 so that by rotating said valve stem it will be raised or lowered vertically.

The extreme upper end of the tubular section 6 is reduced in size and threaded to engage the threads of a cap 10 and by introducing a gasket or flexible washer 11 between the cap and the end of the tubular extension, a perfect seal will be formed therebetween. To prevent leakage around the valve stem, a packing box or chamber 12 is formed in the upper end of the cap to receive any suitable form of packing which is held within the packing box by a nut 13. The major portion of the valve stem 9 is provided with a cavity 14 into the lower end of which is threaded a plug 15, said plug having a bore 16 extending longitudinally thereof to form a bypass, the lower exterior surface of the plug being reduced in diameter and threaded to receive a nut 17 employed for holding the valve 18 in engagement with the flange 15' on the plug, said valve being adapted to engage the seat on the upper end of the flange 5 to close the passage through the faucet.

In order to automatically release the pressure within the pipe lines to which the faucet is attached, when pressure from any cause is increased above a predetermined point, an auxiliary valve 19 is positioned within the cavity 14 and adapted to seat upon the upper end of the plug 15, said auxiliary valve being secured to a washer 20 by introducing the threaded end 21 of a guide finger 22 through the valve into the threaded portion of the washer, said finger having a shoulder 23 for engagement with the lower face of the auxiliary valve.

The auxiliary valve 19 is normally held in engagement with its seat by means of a spring 24, the lower end of which is seated within a flange 25 on the washer 20 while the upper end thereof is seated in a cup-shape member 26 at the upper end of the cavity 14. The tension of the spring 24 is regulated by means of an adjusting screw 27 which is threaded into an opening 28 extending downwardly through the upper end portion of the valve stem and by moving the adjusting screw upwardly or downwardly the tension of the spring will be accordingly decreased or increased and to properly determine when the tension of the spring has been regulated to hold the auxiliary valve seated until a predetermined pressure takes place within the pipe lines, graduations 29 are formed upon the valve stem 9 as shown in Fig. 2 of the drawings and by rotating the adjusting screw until the upper end thereof is in registration with any one of the graduations the auxiliary valve will be retained in seated position until the pressure within the pipe line has been raised to the degree indicated adjacent each graduation. In order to tell when the upper end of the screw has reached a point in line with the desired graduation on the external surface of the stem, a suitable instrument is inserted into the opening 28 to ascertain the distance between the upper end of the screw and the upper end of the valve stem, after which the measurement is transferred to the outside of the stem, where the exact pressure on the auxiliary valve may readily be seen. A handle 30 is attached to the upper end of the stem 9 and is held in position thereon by a screw 31, which screw also threads into the opening 28. The wall of the valve stem 9 at a point adjacent the upper end of the plug 15 is provided with ports 32 through which the water or steam entering the cavity 14 may escape into the discharge end of the passage in the faucet.

Under ordinary circumstances the pressure of the spring upon the auxiliary valve 19 will keep the same closed and the valve stem is rotated in the usual manner to lift the valve 18 from its seat to permit water to flow through the opening 4, but when the valve 18 is closed and the pressure within the pipe line be increased above the normal, the pressure against the auxiliary valve will cause the same to move upwardly and permit the contents of the pipe lines to pass through the bore 16 and through the ports 32 in the valve stem and discharge through the open end of the faucet. As soon as pressure within the pipe lines has been reduced to normal the auxiliary valve 19 will again seat itself over the end of the plug 15, the tapered finger 22 readily guiding the valve to a proper position over the plug thus closing communication between the ends of the faucet. It will likewise be seen that it will require but one faucet of this class in the entire water system as the opening of one auxiliary valve will reduce the pressure in all the pipes of the system as well as the boiler, or if preferred, one faucet may be used with the hot water pipes and system and one with the cold water pipes. It will further be seen that this device can be very easily attached to the valve stem and does not require the changing of any parts of the faucet other than providing the cavity in the stem and extending the threaded opening from the upper end of the valve stem to communicate with the cavity.

Having thus fully described my invention what I claim as new and desire to secure by Letters Patent is:—

The combination with a faucet having a valve seat therein, a valve coöperating with said seat, and a valve stem having a cavity therein and an outlet opening for said cavity, said stem provided externally with graduations, of an apertured plug fitted in the said cavity having a valve seat surrounding said aperture, an auxiliary valve in said cavity coöperating with the last named seat, a spring adapted to direct pressure on said auxiliary valve, a screw to tension said spring, the screw head designed to selectively aline with the graduations to indicate the pressure on the auxiliary valve, a handle for said valve stem, and a screw cap threaded connectedly to the end of the valve stem to close the cavity therein and retain the handle in position on the stem.

In testimony whereof I have signed my name to this specification in the presence of two subscribing witnesses.

BARNEY PIPE.

Witnesses:
L. E. MACY,
C. J. BROWN.